United States Patent [19]
Bryant et al.

[11] Patent Number: 5,228,129
[45] Date of Patent: Jul. 13, 1993

[54] SYNCHRONOUS COMMUNICATION INTERFACE FOR REDUCING THE EFFECT OF DATA PROCESSOR LATENCY

[75] Inventors: Stewart F. Bryant, Surrey; Michael Harwood, Reading, both of England

[73] Assignee: Digital Equipment Corporation, Maynard, Mass.

[21] Appl. No.: 519,263

[22] Filed: May 2, 1990

Related U.S. Application Data

[63] Continuation of Ser. No. 175,056, Mar. 30, 1988, abandoned.

[30] Foreign Application Priority Data

Apr. 1, 1987 [GB] United Kingdom ............... 8707778

[51] Int. Cl.$^5$ .................. G06F 13/00; G06F 15/20
[52] U.S. Cl. .................. 395/325; 395/250; 395/200; 364/239; 364/239.2; 364/238.3; 364/DIG. 1
[58] Field of Search ............. 395/325, 200, 250, 800, 395/275, 775; 364/130, 200 MS File, 900 MS File; 370/32, 100.1, 105.4; 340/825.06, 825.2; 375/7, 110, 121; 377/70, 75, 77

[56] References Cited

U.S. PATENT DOCUMENTS

| | | | |
|---|---|---|---|
| 3,825,905 | 7/1974 | Allen, Jr. ....................... | 395/200 |
| 4,071,887 | 1/1978 | Daly et al. ..................... | 364/200 |
| 4,138,732 | 2/1979 | Suzuki et al. ................... | 364/900 |
| 4,344,132 | 8/1982 | Discon et al. ................... | 364/200 |
| 4,388,683 | 6/1983 | Beifuss et al. .................. | 395/325 |
| 4,441,162 | 4/1984 | Lillie .......................... | 364/900 |
| 4,443,883 | 4/1984 | Berger .......................... | 364/900 |
| 4,497,041 | 1/1985 | Braun ........................... | 364/900 |
| 4,649,384 | 3/1987 | Sheafor et al. .................. | 340/825.03 |
| 4,718,039 | 1/1988 | Aichelmann ...................... | 364/900 |
| 4,748,656 | 5/1988 | Gibbs et al. .................... | 364/900 |
| 4,761,800 | 8/1988 | Lese et al. ..................... | 370/49 |
| 4,771,425 | 9/1988 | Baran et al. .................... | 370/85 |
| 4,907,186 | 3/1990 | Racey ........................... | 364/900 |
| 4,931,924 | 6/1990 | Kageura ......................... | 364/200 |
| 4,962,483 | 10/1990 | Lodhi .......................... | 365/221 |
| 4,989,135 | 1/1991 | Miki ............................ | 364/200 |
| 5,043,883 | 8/1991 | Inouchi et al. .................. | 395/725 |
| 5,133,078 | 7/1992 | Minassian et al. ................ | 395/800 |

FOREIGN PATENT DOCUMENTS 56-30347 3/1981 Japan.
58-48551 3/1983 Japan.

OTHER PUBLICATIONS

"FIFOs eliminate the delay when data rates differ", *Electronic Design*, Nov. 26, 1981, pp. 205-214.

Primary Examiner—Michael R. Fleming
Assistant Examiner—Gopal C. Ray
Attorney, Agent, or Firm—Cesari and McKenna

[57] ABSTRACT

Incoming data which is required to be passed to a desired storage location under the control of a processor is received by a store prior to being passed to a serial communications controller. The store is preferably a FIFO store and stores the data at an incoming data rate determined by the incoming transmission line data rate and feeds the data to the serial communications controller at a higher data rate under the control of a clock generator which is energized by control circuitry only when the serial communications controller indicates that it is able to accept the data. The processor can therefore control the serial communications controller to cease to process incoming data, which data is then stored until the processor can spare the time to recommence processing the incoming data.

28 Claims, 3 Drawing Sheets

SYNCHRONOUS COMMUNICATION INTERFACE FOR REDUCING THE EFFECT OF DATA PROCESSOR LATENCY

This is a continuation of application Ser. No. 07/175,056 filed Mar. 30, 1988 now abandoned.

The present invention relates to data communication systems and more particularly to systems wherein data is received at an input port of a processor for subsequent use by the processor.

A problem which arises with such systems is that if the processor is busy on other tasks it may not be possible for it to perform the system operations necessary for data to be transferred from the data receiving device hereinafter referred to as a serial communications controller, to the data buffer memory, either directly or with the assistance of a direct memory access circuit (DMA). If the incoming data is being sent at high speed and the processor is fully occupied then received information may simply be lost and the data will then have to be retransmitted causing delay and inefficient operation of the system.

It is an object of the present invention to provide a data communication system in which incoming data is extremely unlikely to be lost due to occupancy of a processor on other tasks.

According to the present invention, a data processor is coupled to a synchronous communications link via a communications interface. The communications interface includes a storage device, a serial communications controller, and a control circuit. The storage device, preferably a first-in first-out memory, receives data directly from the link at the link clock rate. The storage device then provides data to the serial communications controller, the serial communications controller formats the data, and the serial communications controller then presents the data to the processor. However, the transfer of data out of the storage device into the communications controller, and hence from the communications controller to the processor, occurs only after the control circuit determines that the data processor is available to receive data from the communications controller.

Preferably the serial communications controller is of the Dual Universal Serial Controller Circuit (DUSCC) type.

In a preferred embodiment a Direct Memory Access (DMA) circuit is interposed between the serial communications controller and the storage means to enable the transfer of the data elements (bytes, words etc) comprising a message, without the intervention of the processor on an element by element basis, the DMA being controlled in turn by a processor. Alternatively a processor may be used directly to control the serial communications controller and thereby the transfer of data into the memory.

Preferably a control means is provided to control the output of information from the FIFO storage device to the DMA dependent on the operative condition of the DMA.

The present invention also provides a method of processing data, received on a data communication link, the method comprising storing said data in a first data storage device at a first clock rate corresponding to the data communication link clock rate and reading the data out of the first data storage device at a second clock rate which is higher than the first clock rate the data being read out of the first data storage device only when the data is able to be processed.

Embodiments of the present invention will now be described with reference to the accompanying drawings in which.

Figure 1:
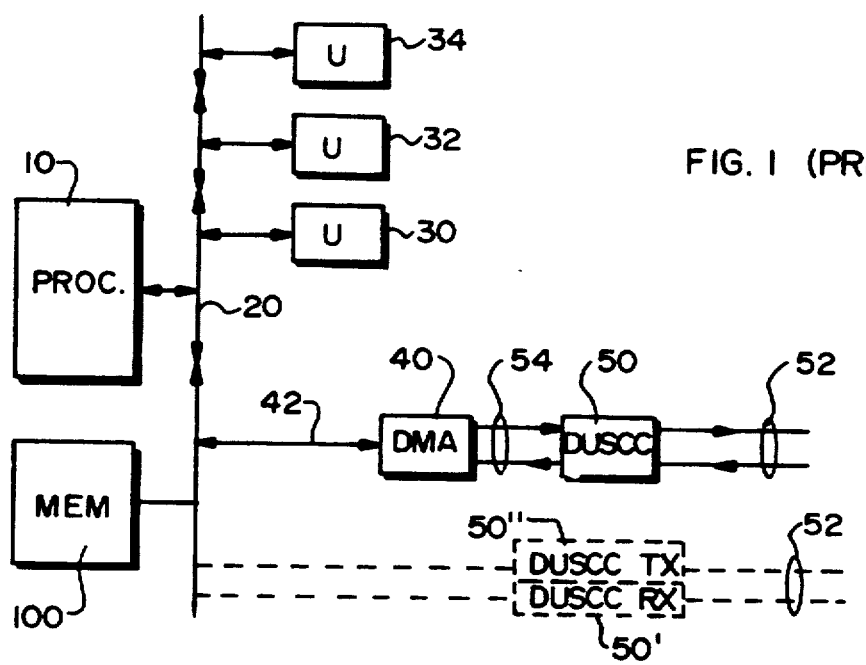
FIG. 1 shows in block diagrammatic form a known data communication system including a processor which receives and transmits data from and to a data communication highway.

With reference now to FIG. 1, a typical data communication system includes a processor 10 connected via a highway 20 to various units 30, 32, 34 and to a direct memory access circuit DMA 40 via a further highway 42. The DMA 40 is able to transmit and receive status and control information to and from the processor 10 and to pass incoming data to a memory 100 for possible future processing. We will refer to the foregoing elements collectively as a "data recipient," because the teachings of the present invention are concerned with transmission of data to them, although they typically will also act as data sources for purposes not relevant to the present invention. A serial communications controller 50 is typically connected to buffer data received from a duplex data link 52 and is connected to DMA 40 via a simplex link 54.

In alternative known arrangements shown in dotted lines the DMA 40 may be omitted. The serial communications controller 50 may be as shown in solid lines or may be split into separate receiver and transmitter sections 50', 50" as shown in dotted lines. The transmitter section may be omitted completely since the present invention is concerned only with the receipt of data.

The alternative described systems of FIG. 1 are all able to function satisfactorily provided that data incoming in link 52 can be fed to the memory 100 at a rate equal to or greater than the rate at which it is received. If for any reason this cannot be accomplished then a part of the data received by serial controller 50 (or 50') will be lost. For the system shown in solid lines, which will be used hereinafter as an example this can occur when two received messages abut on the serial highway. There is a peak in the processor workload at the completion of a message, where it must ascertain the correctness of the newly completed message, and then re-configure the system for the receipt of the next message.

It may be that the processor is busy with another task when this event occurs, or it could be that the amount of time between the adjacent messages is too small for the processor to perform the necessary work. In the limit there may actually be a time period of less than 1 data element. DMA 40 may then not be able to gain access to the memory 100 and may not be able to clear data coming through the serial controller 50. Serial controller 50 will therefore "dump" the data which will be lost. The memory 100 will then either receive none of the data or only a portion and the processor 10 must detect this and indicate a fault probably requiring retransmission of the lost data, or a possible inadvertent reception of corrupt data will take place.

Figure 2:
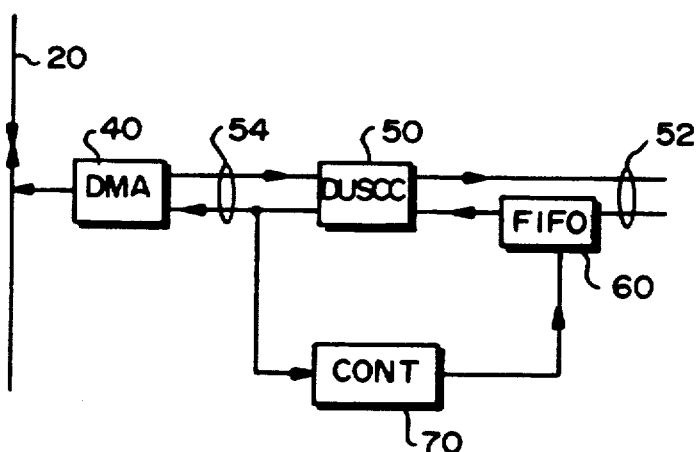
FIG. 2 shows block diagrammatically the data communication system of FIG. 1 modified in accordance with the present invention.

With reference now to FIG. 2 to alleviate this problem according to the present invention line data input storage means 60 is provided between the receiver section of the controller 50 and the link 52. The storage means is controlled by a controller 70 which receives signals derived from the DMA's condition to pass data from the serial controller 50. The storage means 60 therefore acts as a buffer store to retain received data and to pass it to serial controller 50 only when it can be processed by DMA 40. (In the alternative embodiment shown in dotted lines in FIG. 1 the control signals will be derived directly from the processor 10 and the data passed directly from the receiver section of controller 50 into the memory 100 or into a register with the processor).

Figure 3:
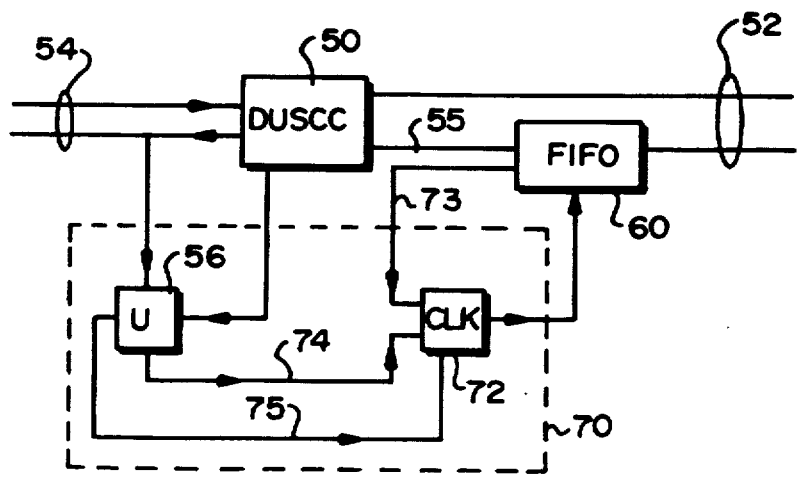
FIG. 3 shows block diagrammatically in greater detail control means for the system of FIG. 2.

The principle of operation of the invention will now be described in general with reference to FIG. 3 in which the storage means 60 is a FIFO store. Data received on link 52 is stored in FIFO 60 at the data rate of the link for example 2 M bits per second and may be fed into the input 55 of controller 50 at a higher data rate— for example 4 M bits per second under the control of controller 70.

Controller 70 includes the component parts shown within the dotted line and include a 4 M bit clock generator 72 which is connected to clock data out of FIFO 60 into the controller 50 when it is actuated. The general operation is that clock generator 72 is normally running but may be de-energized by either a signal on line 73 indicating that FIFO 60 is empty or by a signal on line 74 from a unit 56 monitoring the controller to DMA link 54 indicating that the DMA is unable to receive and process any further data at that time. A clock start signal may be given by unit 56 on line 75 when an acceptable condition is present on the link 54. This restarts clock generator 72 if any data is still left in FIFO store 60. Thus incoming data may be stored in FIFO store 60 at the data rate of link 52 and if DMA 40 is unable to process the data it will steadily fill up the store. The capacity of store 60 may be varied to suit the anticipated delay time during which DMA 40 may be unable to accept data for transfer to processor 10. The store 60 may, for example, be 64 bits long or 16 K bits or if a controlled Random Access Memory (RAM) is used it can be several M bits long.

Once DMA is able to access memory 100 (see FIG. 1) then clock generator 72 may be energized and data will be fed into controller 50 for subsequent transfer, on demand, to DMA 40 and then to memory 100.

Figure 4:
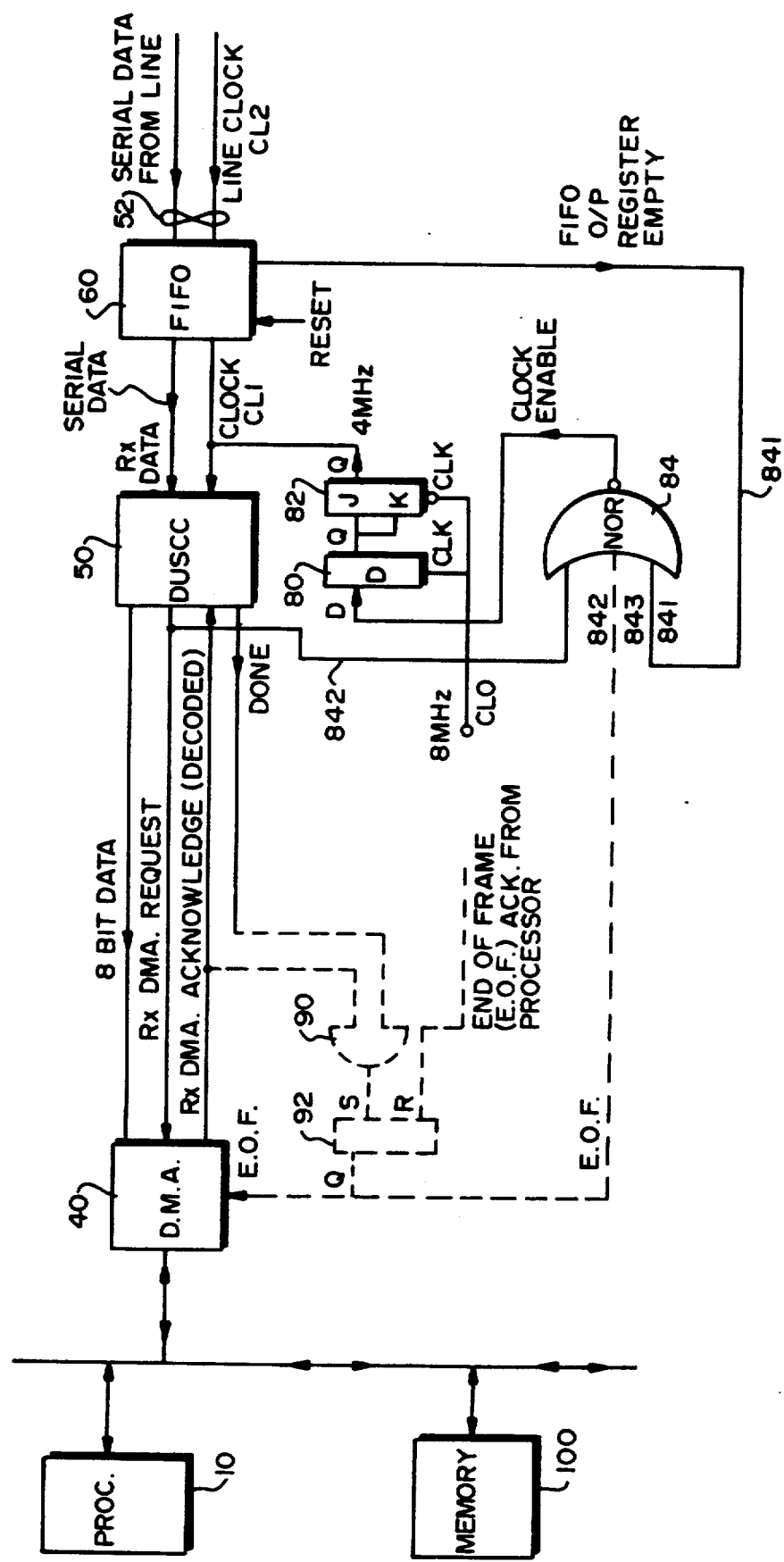
FIG. 4 shows block diagrammatically an alternative control means for specific data protocol systems.
Figure 5:
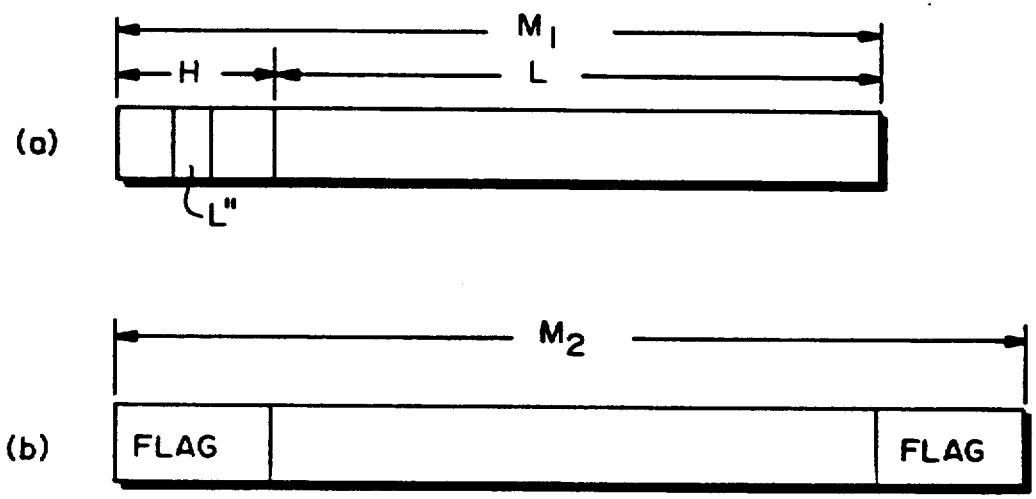
FIG. 5 shows two data protocol systems for receipt by the embodiment of FIG. 4.

With reference now to FIG. 4, specific embodiments are shown related to bit oriented protocol data transmission and character oriented protocol transmissions. The message format of these protocols is illustrated diagrammatically in FIG. 5.

FIG. 5a shows a character oriented protocol for example DDCMP (Digital Data Communications Message Protocol) in which the length of each message can be determined by decoding the header of the message. The header is of fixed length, and contains fields that are decoded to determine the presence of a length field within the header, which in turn is decoded to determine the message size. This is illustrated by the section L in the message of length M1. Thus "L" can be decoded to determine the length of any message and is normally part of a header section H.

FIG. 5b shows a bit oriented protocol (e.g. HDLC) in which the message M2 is preceded by a FLAG section comprising a predetermined sequence of bits (e.g. 01111110) and is terminated by the same FLAG sequence. (There are byte oriented protocols of this general type such as bisync). The system therefore does not know the length of any message at the start of the message but must wait until the second FLAG sequence is received to recognise the end of message M2.

These two types of protocol are dealt with in a practical system as shown in FIG. 4 by including the circuitry shown in dotted outline for bit oriented protocol data transmission as now described.

The data is received at the input of FIFO 60 and is stored therein at a rate determined by the line clock CL2. The output of data from FIFO 60 is controlled by the clock CL1. For the invention to work clock rate CL1 must be greater than clock rate CL2 and in a practical embodiment a ratio of two to one or greater is preferable.

Clock CL1 is generated by two flip flops 80, 82 of D type and JK type respectively and when running clock CL1 controls both the FIFO 60 and the serial communications controller 50. The effect of the two flip flops is to divide an input lock CL0 by two to produce an output clock CL1. The D type flip flop 80 is used to synchronise the clock control signal from 84, its action is to prevent the signal on J & K of flip-flip 82 from changing on the 8 MHZ clock edge on which it toggles, thus reducing the metastable susceptability of the system. The JK flip flops 82 is controlled by the D type flip flop 80. The clock ceases to run on receipt of a signal from a NOR gate 84 which changes over the state of D type flip flop 80. Thus clock CL1 is normally running and ceases only when either there is no further data in the FIFO store 60 or when the DUSSC or the DMA cannot handle any further data at that time. If no DMA is present then the clock CL1 will be stopped on instruction direct from the processor.

The detailed operation of the system will now be described. In order to be able to refer to specifically generated control signals a particular type of serial communications controller and DMA are referred to by way of example only. Other types will generate similar control signals which maybe used to control the flow of data through FIFO 60. If no DMA is used then the signals may be generated by the processor 10.

The serial communications controller may be of the SIGNETICS 68562 DUSCC type and data and control signals are of a type used to control a DMA of the SIGNETICS 68430 type. The signals shown are as follows.

Rx DMA Request: This line is asserted to indicate that a receiver in the DUSCC requires service.

DMA END of frame: Typically used to prematurely terminate a DMA block transfer. This signal also causes the DMA to correctly processs any buffered transactions that have occurred prior to the signal.

DMA acknowledge: This is a specific signal indicating to the requesting device that the DMA transaction has been accepted for processing and that the device may transfer the information present at its output.

DONE: A signal indicating that the DUSCC has detected that the current character being transferred is the last character of a frame.

The operation of the circuit is as follows:

Assume the conditions that there is no RX DMA REQUEST and that there is a data in FIFO 60 which is required to be processed by processor 10 or stored in memory 100. (For the present assume the EOF signal is not present; its effect will be explained later).

In this instance NOR gate 84 has only 2 signals, FIFO O/P register empty, which from the above assumptions will be false resulting in 841 being deasserted; and Rx DMA request on line 842 which is also false since there is no DMA request yet. The O/P NOR gate (clock enable) 84 is thus asserted (high). This signal is latched by D type flip flop 80 on the next low to high transition of CL0.

The action of the JK flip flop is controlled by the Q output of the D type flip flop. If the output of NOR gate 84 was true on the previous positive clock edge of the CL0 clock cycle then Q of D type flip flop 80 will be set, and thus J and K of flip flop 82 will be set thus the Q output of JK flip flop 82 will toggle on the next high to low clock edge. In this way clock CL1 is generated at a frequency of half that of CL0. This causes JK flip flop 82 to function as a divide by two circuit for clock CL0 and produce clock CL1 which is a clock for clocking data out of FIFO 60 and also for clocking data into DUSCC 50. When the O/P of NOR gate 84 is false on the previous active clock edge of the CL0 clock cycle J and K are clear, causing the Q output of JK flip flop 82 to remain in its previous state at each clock tick.

If all data is subsequently clocked out of FIFO 60 then FIFO 60 will then assert O/P register empty signal on line 841 and the output of NOR gate 84 (clock enable) will be de-asserted thereby de-asserting the D input to D type flip flop 80, and on the next 8 MHz active clock edge deasserting the J & K inputs to JK flip flop 82. Thus clock CL1 will effectively stop before the next 4 MHz clock tick thereby providing an effective "instantaneous" stop for clock CL1.

If serial data is again clocked into FIFO 60 from line 52 by the line clock CL2 then the FIFO O/P register empty signal will be de-asserted indicating data in FIFO 60 and clock CL1 will recommence.

When a complete character is present in the DUSCC 50 then Rx DMA REQUEST becomes true and the input (842) is asserted. This de-asserts the output of NOR gate 84 and stops clock CL1 (as described above). Thus data flow from the FIFO 60 to DUSCC 50 stops.

If it is configured to transfer data then at some later time the DMA responds to DMA Request by asserting DMA ACKNOWLEDGE which serves to clock data out of the DUSCC 50 into the DMA for subsequent storage in memory 100.

As this byte of data is clocked out of the DUSCC the Rx DMA REQUEST becomes false and input 842 of NOR gate 84 becomes false allowing clock CL1 to recommence to clock further data (if present) from FIFO 60 to DUSCC 50.

If the system does not have a DMA then the processor 10 will control the flow of information directly. Thus the processor may provide an equivalent "DMA ACKNOWLEDGE" signal to the DUSCC to clock information from the DUSCC directly into the processor 10 or memory 100. This signal may be derived by interpreting a read from a suitable memory location as a RX DMA ACKNOWLEDGE.

For character oriented (e.g. DDCMP type) operation the above process will be continued byte by byte until the DMA determines that is has transferred a complete buffer (i.e. a defined series of storage locations of predetermined length) from the DUSCC to the memory. There will be no more DMA ACKNOWLEDGE signals produced until the processor 10 reprograms the DMA. During this period (which may be very short if the processor is otherwise idle or long if the processor is very busy) data continues to flow into FIFO 60. One byte of such data is transferred into DUSCC 50 and a Rx DMA REQUEST signal is output. This signal will stop clock CL1 and since the DMA is not ready it will not generate Rx DMA ACKNOWLEDGE so that the clock CL1 will remain stopped. Thus data will accumulate in FIFO 60.

In bit oriented protocols such as HDLC the termination comes only from within the message itself. In this case the DUSCC provides a DONE signal to inform the DMA that it has reached the completion of a message. Under these circumstances the DMA has a buffer which is longer than (or equal to) the maximum message size or a series of buffers that may be consecutively filled, until the end of message is reached as indicated by the assertion of the EOF signal.

In this mode of operation the system works as described above transferring data from DUSCC 50 to DMA 40 until DUSCC 50 determines the end of a message and asserts DONE. Flip flop 92 is of the RS type and the output of AND gate 90 is connected to the set input. When DONE and DMA ACKNOWLEDGE are both asserted then the output of AND gate 90 also becomes asserted, and this sets the output of flip flop 92 true and asserts EOF to DMA 40. DMA 40 then flushes any bytes held internally from DUSCC 50 and informs the processor 10 that this particular DMA transaction is complete. The processor 10 is then able to determine the size of the message from the registers within the DMA containing the message.

The EOF signal asserted by flip flop 90 provides an input on line 843 to NOR gate 84 and this sets D type flip flop input to false thereby stopping clock CL1.

The reason that the DONE signal must be ANDed with DMA ACKNOWLEDGE is because the DUSCC is a 2 channel device, with only a single DONE O/P. Thus Rx DMA ACKNOWLEDGE and DONE act to decode the DONE into a DONE - Rx chan $\phi$ and DONE - Rx chan 1 signal pair.

DMA ACKNOWLEDGE is set false at the end of each DMA transfer, and since DONE is only true during the DMA transfer cycle this S input to RS flip flop 90 only acts momentarily.

The output of RS flip flip 90 thus remains asserted until EOF ACKNOWLEDGE from the processor is asserted.

In a subsequent operation the processor is required to reconfigure DMA 40 to "DMA" a new message from DUSCC 50 into for example a selected memory location in memory 100. The processor ascerts EOF ACKNOWLEDGE (which is also a pulse) to the reset input R of flip flop 92 thus causing the Q output of 92 to be reset thereby removing the effect of EOF from the DMA and setting the input (on line 843) to NOR gate 84 to false thereby allowing clock CL1 to be restarted to transfer further data (if present) from FIFO 60 to DUSCC 50.

In a system where there is no DMA 40, provision is made for the processor 10 to have access to the output of flip flop 92 by a suitable n technique so that the processor 10 is able to poll the output to see when a frame is complete.

The DUSCC 50 will, when set up to receive, remove any FLAG or SYNC signals automatically. The reception of FLAG or SYNC signals will not assert DMA REQUEST, this not being asserted until after receipt of the first non FLAG or SYNC character.

The reset signal to FIFO 50 may be asserted at the commencement of a receive operation to clear FIFO 60 of all data. Alternatively the data present in FIFO 60 may be fed to DUSCC 50 which will "dump" the initial data—which may be garbled—until it receives genuine FLAG or SYNC signals on which it will act.

The processor 10 will require access to the DUSCC 50 at the end of each frame to determine status information such as for example CRC (cyclic redundancy check sum) error. This may be obtained either through the DMA 40 or direct (via a link not shown) from the DUSCC.

The provision of FIFO 60 in the position shown to receive data is the preferred embodiment. It may however be possible to provide the FIFO 60 in a position between DUSCC 50 and DMA 40. As explained hereinafter this presents severe problems however for any sophisticated system and is not therefore preferred.

Most types of serial communications controller accummulate status information which is obtained from the incoming data. If the FIFO 60 is placed after the serial communications controller 50 then such status information obtained from the incoming data must be stored separately and thus FIFO 60 would have to be larger and its interfaces more complex. In its simplest form it would require to store data and status information separately but in a parallel form allowing the processor 10 access to both either via the DMA or directly.

Also in character oriented mode the DUSCC 50 accummulates CRC (cyclic redundancy check) errors and at any stage prior to a CRC being considered good the DUSCC reports it as bad by ORing this with the accummulated CRC error. Thus to identify a correct message this status bit must be cleared by the processor just prior to the last byte of a message perculating to the top of the DUSCC internal Rx FIFO. If the external FIFO is on the output of DUSCC 50 then this operation will not be possible. Thus extension of the FIFO by incorporation of a parallel external FIFO is not possible in this case.

Thus the preferred position for FIFO 60 is on the incoming side of DUSCC 50.

It should be noted that FIFO 60 operates on incoming data only. Transmitted data can be fed through DUSCC 50 or can be fed through a separate transmitter circuit or can be completely absent in a receive only situation for example for line monitoring operation.

Figure 6:
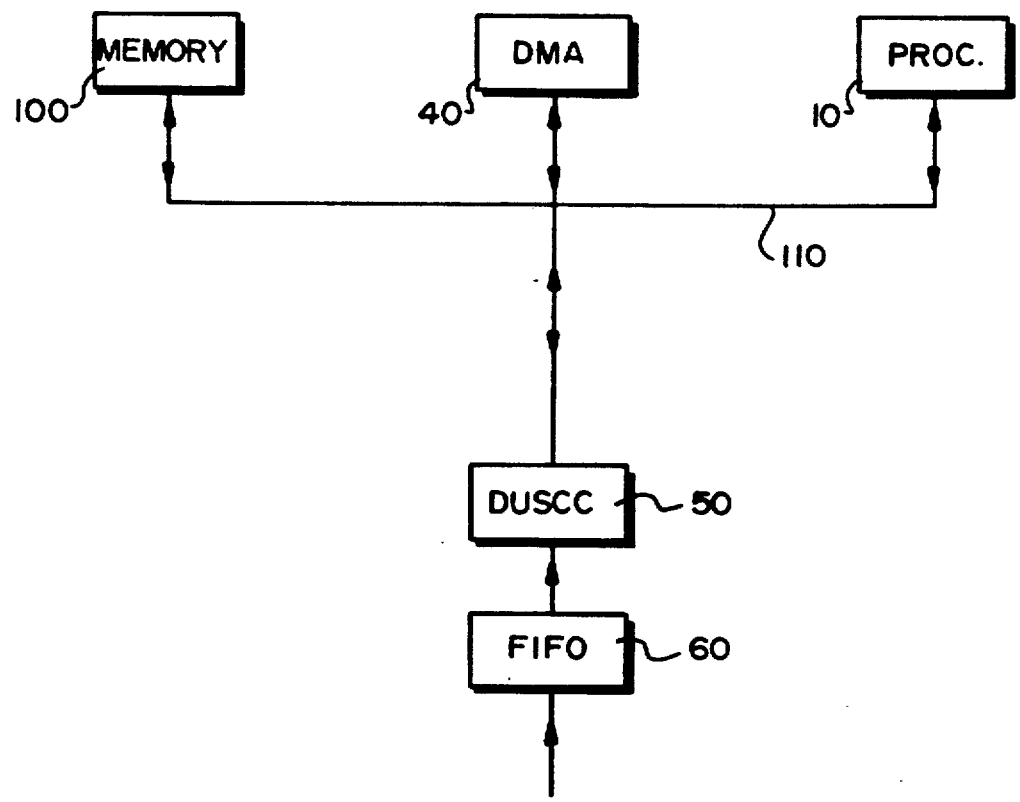
FIG. 6 shows block diagrammatically an alternative data communication system modified in accordance with the present invention.

With reference now to FIG. 6 the processor 10 DMA 40 and memory 100 may, as shown, be connected by a common bus 110 which is also connected as shown to the DUSCC 50. The system can operate as in the system of FIG. 4 except that the DUSCC 50 can have direct access to the memory 100 or the processor 10. When the DMA 40 and processor 10 are occupied the FIFO 60 is used to store incoming data which is processed by DUSCC 50 as required and as explained hereinbefore with reference to FIG. 4.

The embodiments of FIGS. 4 and 6 may be readily modified to process messages wherein the DMA 40 can readily keep up except at the end of frames. In such a case the clock CL1 need only be stopped at the End of Frame (EOF) signal since the DUSCC and DMA can keep up at all other times. In this case the clock CL1 can be restarted by a signal from the DMA indicating that it has completed its "End of Frame" processing of the data and is ready to commence to receive a further message, clock CL1 being again stopped by the end of frame signal at end of the further messages etc. etc.

We claim:

1. A data communications interface for providing, to a synchronous communication link that carries serial input data and a synchronous link clock signal, access to a data recipient that includes a processor, reads parallel output data applied thereto, and generates an acknowledge signal to indicate that it has read the parallel output data, the interface comprising:

a serial communications controller, coupled to the link and the data recipient, for receiving the serial input data from the link at times specified by transitions in the link clock signal, reformatting the serial data into parallel output data, providing to the data recipient the parallel output data and a request signal, asserting the request signal to request that the parallel output data be read by the data recipient, and responding to an acknowledge signal from the data recipient by de-asserting the request signal;

first-in, first-out (FIFO) storage means, interposed between the serial communications controller and the link, for storing the serial input data from the link at times specified by level transitions in the synchronous link clock signal and responding to application of an output clock signal thereto by transmitting the serial input data to the serial communications controller at times specified by level transitions in the output clock signal; and control means for receiving the request signal from the serial communications controller and for providing the output clock signal to the storage means, the control means disabling the output clock signal when the request signal is asserted.

2. A data communication interface as in claim 1 wherein the serial communications controller is of the Dual Universal Serial Controller Circuit (DUSCC) type.

3. A data communication interface as in claim 1 wherein:

the storage means additionally includes means for detecting the absence of data therein and asserting a FIFO empty signal indicative thereof; and the control means additionally disables the output clock signal when the FIFO empty signal is asserted.

4. A data communication interface as in claim 3 wherein the serial communications controller is of the Dual Universal Serial Controller Circuit (DUSCC) type.

5. A data communication interface as in claim 3 wherein:

the serial communications controller is responsive to the presence in the serial input data of a predetermined end-of-message-indicating sequence to generate a message-completion signal indicating the end of a message; and the control means additionally comprises means for responding to overlapping assertions of the message-completion and acknowledge signals by disabling the output clock signal and keeping it disabled until the control means receives an end-of-frame signal from the data recipient.

6. A data communications system as in claim 1 wherein the data recipient includes direct memory access (DMA) control means, connected between the serial communications controller means and the processor, for reading the parallel output data from the serial communications controller in response to assertion of the request signal, for asserting the acknowledge signal to indicate that it has read the parallel output data from the serial communications controller, and for transferring the parallel output data to the processor.

7. A data communications system as in claim 6 wherein the serial communications controller is of the Dual Universal Serial Controller Circuit (DUSCC) type.

8. A data communications system as in claim 6 wherein:
the storage means additionally includes means for detecting the absence of data therein and asserting a FIFO empty signal indicative thereof; and
the control means additionally disables the output clock signal when the FIFO empty signal is asserted.

9. A data communications system as in claim 8 wherein the serial communications controller is of the Dual Universal Serial Controller Circuit (DUSCC) type.

10. A data communications systems as in claim 8 wherein:
the serial communications controller is responsive to the presence in the serial input data of a predetermined end-of-message-indicating sequence to generate a message-completion signal indicating the end of a message; and
the control means additionally comprises means for responding to overlapping assertions of the message-completion and acknowledge signals by disabling the output clock signal and keeping it disabled until the control means receives an end-of-frame signal from the data recipient.

11. A data communications system as in claim 6 wherein the second clock rate exceeds the first clock rate.

12. A data communications system comprising:
A) a synchronous communication link that carries serial input data and a synchronous link clock signal having transitions that occur at a first clock rate;
B) a data recipient, including a processor, for reading parallel output data applied thereto in response to assertion of a request signal applied thereto, and for generating an acknowledge signal to indicate that it has read the parallel output data; and
C) a data communications interface comprising:
i) a serial communications controller, coupled to the link and the data recipient, for receiving the serial input data from the link at times specified by transitions in the link clock signal, reformatting the serial data into parallel output data, providing to the data recipient the parallel output data and the request signal, asserting the request signal to request that the parallel output data be read, and responding to an acknowledge signal from the data recipient by de-asserting the request signal;
ii) first-in, first-out (FIFO) storage means, interposed between the serial communications controller and the link, for storing the serial input data from the link at times specified by level transitions in the synchronous link clock signal and responding to application of an output clock signal thereto by transmitting the serial input data to the serial communications controller at times specified by level transitions in the output clock signal; and
iii) control means for receiving the request signal from the serial communications controller, for generating transitions in the output clock that occur at a second clock rate greater than the first clock rate, disabling the output clock signal when the request signal is asserted, and applying the output clock signal to the storage means, the control means thereby controlling the flow of data from the storage means into the serial communications controller.

13. A data communications system as in claim 12 wherein the processor provides the acknowledge signal directly to the serial communications controller.

14. A data communications system as in claim 13 wherein the serial communications controller is of the Dual Universal Serial Controller Circuit (DUSCC) type.

15. A data communications system as in claim 13 wherein:
the storage means additionally includes means for detecting the absence of data therein and asserting a FIFO empty signal indicative thereof; and
the control means additionally disables the output clock signal when the FIFO empty signal is asserted.

16. A data communications system as in claim 15 wherein the serial communications controller is of the Dual Universal Serial Controller Circuit (DUSCC) type.

17. A data communications system as in claim 15 wherein:
the serial communications controller is responsive to the presence in the serial input data of a predetermined end-of-message-indicating sequence to generate a message-completion signal indicating the end of a message; and
the control means additionally comprises means for responding to overlapping assertions of the message-completion and acknowledge signals by disabling the output clock signal and keeping it disabled until the control means receives an end-of-frame signal from the data recipient.

18. A data communications system as in claim 13 wherein the second clock rate exceeds the first clock rate.

19. A data communications system as in claim 12 wherein the serial communications controller is on the Dual Universal Serial Controller Circuit (DUSCC) type.

20. A data communications system as in claim 12 wherein:
the storage means additionally includes means for detecting the absence of data therein and asserting a FIFO empty signal indicative thereof; and
the control means additionally disables the output clock signal when the FIFO empty signal is asserted.

21. A data communications system as in claim 20 wherein the serial communications controller is of the Dual Universal Serial Controller Circuit (DUSCC) type.

22. A data communications system as in claim 20 wherein:

the serial communications controller is responsive to the presence in the serial input data of a predetermined end-of-message-indicating sequence to generate a message-completion signal indicating the end of a message; and the control means additionally comprises means for responding to overlapping assertions of the message-completion and acknowledge signals by disabling the output clock signal and keeping it disabled until the control means receives an end-of-frame signal from the data recipient.

23. A data communications system as in claim 12 wherein the second clock rate exceeds the first clock rate.

24. A method of transferring data in parallel to a data recipient, the data recipient including a processor which reads parallel output data applied to the data recipient, and generates an acknowledge signal to indicate that the data recipient has read the parallel output data, the data received as serial input data from a synchronous communication link that also provides a synchronous link clock signal having transitions that occur at a first clock rate, the method comprising the steps of:

storing the serial input data from the synchronous communication link in FIFO data storage device at times specified by transitions in the synchronous link clock signal provided by the link;

providing a serial communications controller, coupled to the FIFO data storage device and the data recipient, for receiving the serial input data from the FIFO data storage device, reformatting the serial data into parallel output data, asserting the request signal to request that the parallel output data be read, and responding to an acknowledge signal from the data recipient by de-asserting the request signal;

generating a controller clock signal having transitions that occur at a second clock rat and which is disabled when the request signal is asserted;

reading the serial input data serially out of the FIFO data storage device, and, in turn, reading the serial input data serially into the serial communications controller, at times specified by the controller clock signal; and transferring the parallel output data from the communications controller to the data recipient.

25. A method as defined in claim 24 wherein the second clock rate exceeds the first clock rate.

26. A method as defined in claim 24 wherein the output clock signal is disabled so long as the FIFO data storage device contains no data.

27. A method as in claim 26 wherein:

the serial communications controller is responsive to the presence in the serial input data of a pre-determined end-of-message-indicating sequence to generate a message-completion signal indicating the end of a message; and the controller clock signal becomes disabled upon overlapping assertions of the message-completion and acknowledge signals and remains disabled until the data recipient generates an end-of-frame signal.

28. A method as defined in claim 27 wherein the second clock rate exceeds the first clock rate.

* * * * *